United States Patent [19]

Bennato

[11] Patent Number: 5,182,586
[45] Date of Patent: Jan. 26, 1993

[54] SUNGLASSES STRUCTURE

[75] Inventor: Antonio Bennato, Fener di Alano di Piave, Italy

[73] Assignee: Moda Solaris S.p.A., Pederobba, Italy

[21] Appl. No.: 556,246

[22] Filed: Jul. 20, 1990

[30] Foreign Application Priority Data

Jan. 26, 1990 [IT] Italy .............................. 82511 A/90

[51] Int. Cl.⁵ .............................................. G02C 9/00
[52] U.S. Cl. ..................................... 351/47; 351/128; 351/132; 351/136; 351/44
[58] Field of Search ...................... 351/41, 44, 47, 158, 351/128, 138, 132, 136

[56] References Cited

U.S. PATENT DOCUMENTS 4,704,015 11/1987 Grendol et al. ...................... 351/138
4,877,320 10/1989 Holden ................................. 351/44
5,016,999 5/1991 Williams ............................. 351/41

Primary Examiner—Bruce Y. Arnold
Assistant Examiner—Hung Xuan Dang
Attorney, Agent, or Firm—Guido Modiano; Albert Josif

[57] ABSTRACT

The sunglasses structure comprises a front piece, an arm hinged to each end of the front piece, and a one-piece lens supported by the front piece. A milling is formed in the lens which is substantially V-shaped, with inwardly protruding coupling elements. A V-shaped elastically deformable bridge is insertable into the milling. The bridge has a perimetral groove for accommodating a perimetral portion of the milling and a plurality of seats accommodating the coupling elements, which snap into engagement with the seats upon inserting bridge into the milling. Air vents are provided at a lateral portion of the lens for preventing misting.

13 Claims, 2 Drawing Sheets

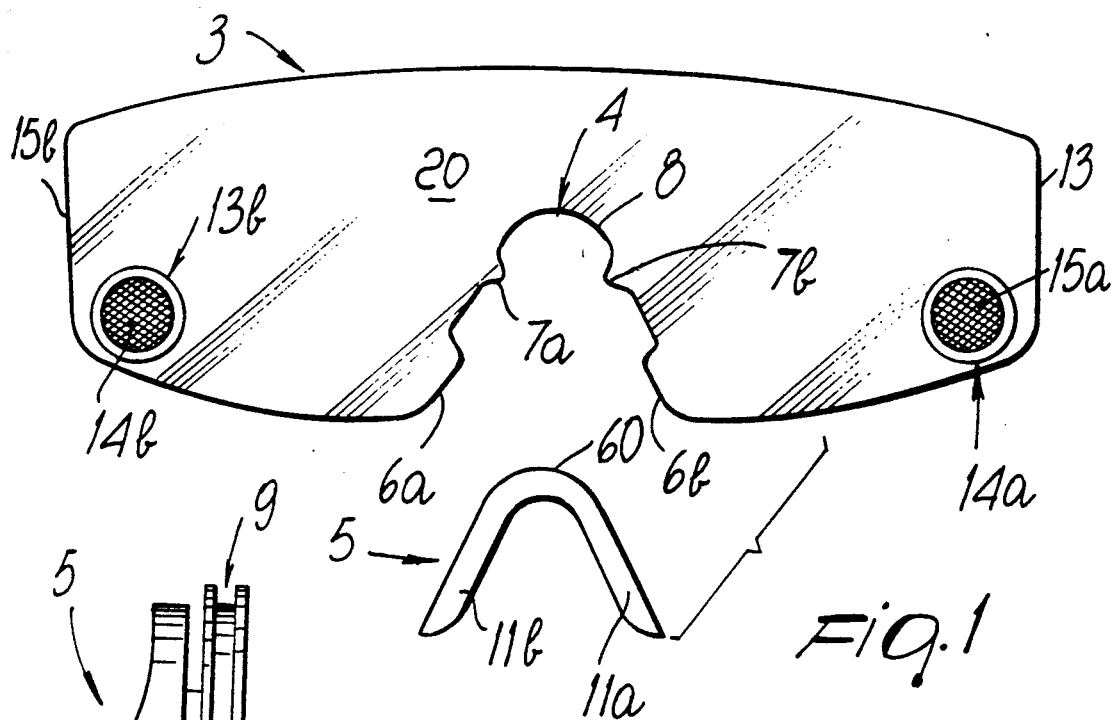
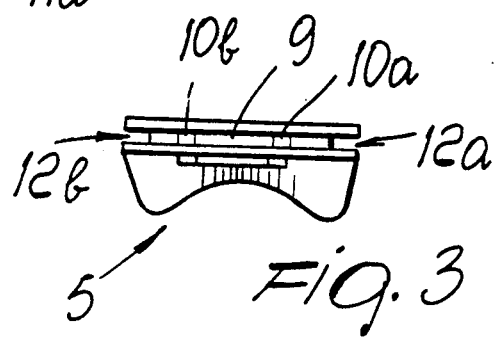
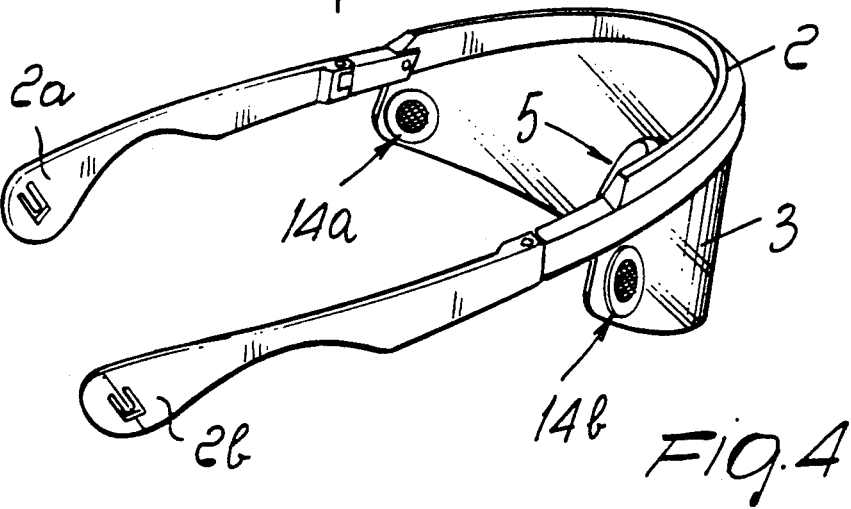

5,182,586

SUNGLASSES STRUCTURE

BACKGROUND OF THE INVENTION

The present invention relates to a sunglasses structure.

The use of a single lens which preferably has an arcuate shape and is associated at a frame is currently known in sunglasses.

Such known types of sunglasses, however, have a disadvantage: if the lens has a considerable curvature, which partially embraces the outer lateral regions of the user's face which are adjacent to the eye, misting of said lens occurs due to poor air circulation.

This occurs especially in the case of a sports use of the glasses, such as on ski slopes or in particular weather conditions where a low outside temperature is combined with the athlete's perspiration.

In such known types of glasses composed of a single lens it is furthermore necessary to associate with said lens a lug or bridge for resting on the user's nasal septum.

In some known sunglasses composed of a single lens, a central milling is provided for this purpose and has, on its perimetric edge, a pair of rounded protrusions which act as grip elements for a rubber lug which can be arranged thereat.

This solution also has a disadvantage: the uncoupling of the lug is in fact frequent and occurs both during use, especially sports use, and during the handling of the sunglasses, as in the case of their storage or wearing.

SUMMARY OF THE INVENTION

The aim of the present invention is therefore to eliminate the disadvantages described above in known types by providing a sunglasses structure having improved aeration of the lens which prevents said lens from misting.

Within the scope of the above described aim, another important object is to provide a sunglasses structure which has a removable lug which can be safely and stably associated with the lens.

Another important object is to obtain glasses which are safe and reliable in use.

Another object is to obtain glasses which associate with the preceding characteristics that of being structurally simple as well as rapid and easy to industrialize.

Not least object is to obtain glasses which associate with the preceding characteristics that of having modest manufacturing costs.

The above described aim and objects, as well as others which will become apparent hereinafter, are achieved by a structure of sunglasses, comprising a single lens associated with a front portion, which is characterized in that said lens has at least three temporary coupling elements for complementarily shaped grip elements provided on a lug, said lens having at least one lateral air intake which can possibly be partially closed.

BRIEF DESCRIPTION OF THE DRAWINGS

Further characteristics and advantages of the invention will become apparent from the detailed description of a particular but not exclusive embodiment, illustrated only by way of non-limitative example in the accompanying drawings, wherein:

FIG. 1 is a front view of the lens of the sunglasses according to the invention, which for the sake of clarity has been developed on a plane and in which the bridge has been removed;

FIG. 2 is a side view of the bridge;

FIG. 3 is a top view of the bridge;

FIG. 4 is a lateral perspective view of a sunglasses structure;

DESCRIPTION OF THE PREFERRED EMBODIMENTS

Figure 5:
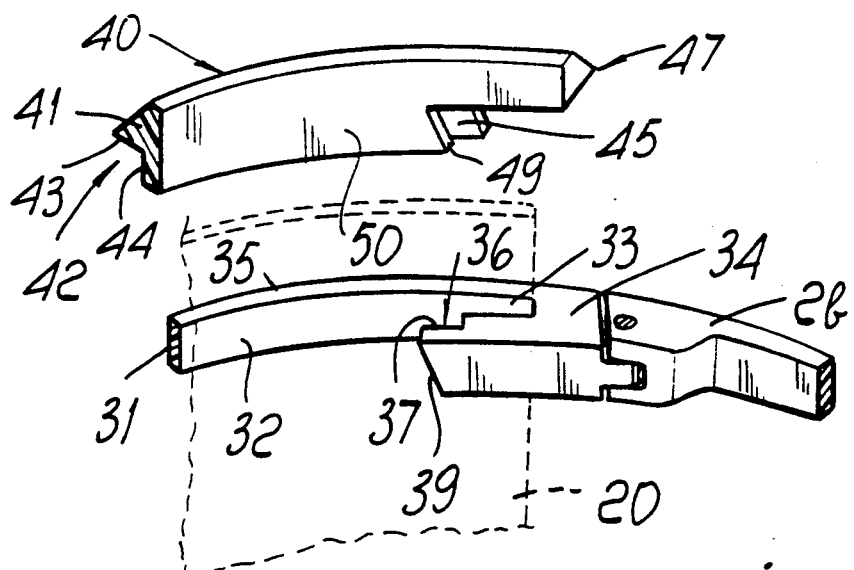
FIG. 5 is an exploded fragmentary perspective view illustrating the structural interrelationship between the elements constituting the front portion of the sunglasses of FIGS. 1–4, and the lens thereof.
Figure 6:
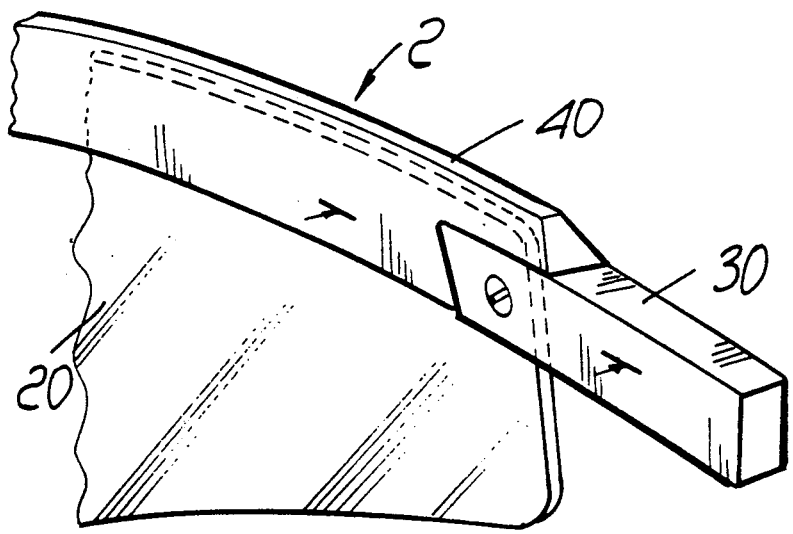
FIG. 6 is a partially sectional fragmentary perspective view of a sunglasses structure according to the invention.
Figures 7, 8:
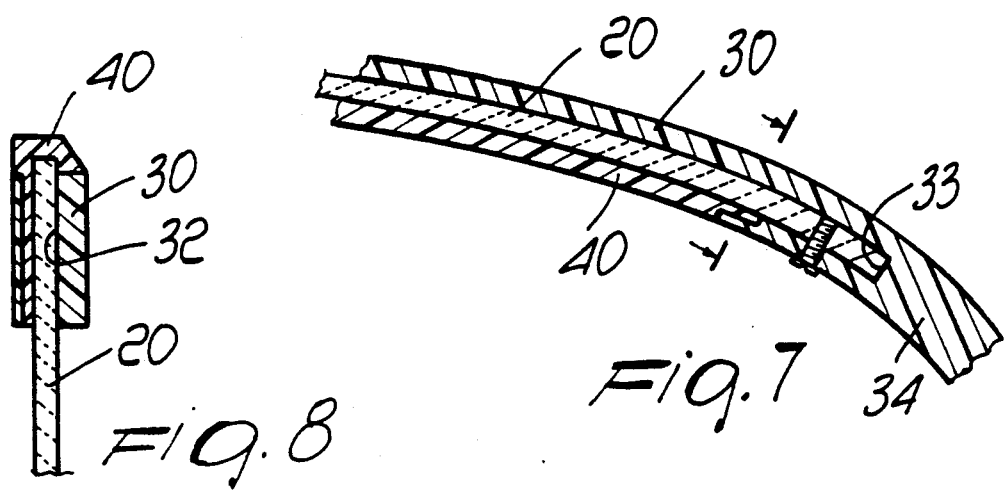
FIG. 7 is a sectional view taken along the plane VII—VII of FIG. 6.
FIG. 8 is a sectional view taken along the plane VIII—VIII of FIG. 7.

With reference to the above figures, the sunglasses structure, generally indicated by the reference numeral 1, is constituted by a front portion 2 having arms 2a, 2b hinged thereto and an associated lens 20 having an arcuate configuration.

Advantageously, the front portion 2 is constituted by a cross member 30 and an upper element 40. The cross member 30 has a substantially rectangular cross section 31 defining an inner face 32 against which the lens 20 abuts. An elongate groove 33 is formed in an enlarged end portion 34 of the cross member 30 and accommodates a portion of the lens 20. The upper cover element 40 expediently has an irregular hexagonal cross section 41 defining a recess 42 having a first face 43 and a second face 44. The first face 43 of the recess 42 abuts against an upper surface 35 of the cross member 30, while the second face 44 of the recess 42 abuts against an upper peripheral portion of the lens 20. Thus, the upper edge of the lens 20 is held between the inner face 32 of the cross member 30 and the second face 44 of the recess 42 formed in the cover element 40.

The enlarged end portion 34 of the cross member 30 also has formed thereon a connection recess 36 located adjacent to the groove 33 and having an abutment face 37 engaging a lateral surface 45 of a tongue 46 rigidly associated with a terminal portion 47 of the cover element 40. A first inclined surface 49 extends substantially perpendicularly to the lateral surface 45 of the tongue 46 and abuts against a second inclined surface 39 extending substantially perpendicularly to the abutment face 37 of the connection recess 36.

In this manner, once the lens 20 is engaged in the connection recess such that its upper peripheral edge is located between the inner face 32 and the second face 44, and the tongue 46 is engaged in the connection recess 36, the lens is frictionally retained in position. By virtue of the inclination of the first 49 and second 39 inclined surfaces, the cover element 40 is retained in place on the cross member 30. Engagement between the upper cover element 40 and the cross member 30 is allowed by different thickness between the tongue 46 of the upper cover element 40 and the abutment face 37 of the cross member 30. In order to fix the structural arrangement assembled as described heretofore, adhesive or ultrasonic welding or similar techniques may be used, or mechanical fixing devices such as screws may be adopted, e.g., screws may be used in a concealed manner by being screwed into the inner face 50 of the cover element 40, passing through the material constituting the lens 20, and engaging the cross member 30. In this manner, the heads of such screws are not visible when the sunglasses are worn. The arms 2a, 2b are connected to the front portion 2, by means of conventional hinges, not illustrated for clarification purposes.

Said lens 20 has, approximately at the median region 3, a milling 4 which is essentially V-shaped and is therefore symmetrical to the transverse middle axis II—II of said lens; temporary coupling means are provided on said milling for a bridge 5.

Said coupling elements are constituted by a first and a second pair of raised portions, respectively indicated by the numerals 6a, 6b, and 7a, 7b, which protrude from the perimetral edge 8 of the V-shaped milling 4.

Complementarily shaped grip elements provided on the bridge 5 are temporarily associable with said first and second pair of raised portions, which are symmetrical with respect to the transverse middle axis II—II of the lens 3.

Said bridge 5 has a V-shaped configuration and is preferably made of plastic material in order to confer on said lug a certain degree of elasticity, whereby it can be elastically deformed for insertion into the V-shaped milling 4.

The bridge 5 furthermore has a perimetral groove 9 which constitutes a seat for accommodating a portion of the perimetral edge 8 of the lens 3, as well as a first pair of seats 10a and 10b, shaped complementarily to the second pair of raised portions 7a and 7b, provided at said perimetral groove 9.

A second pair of seats 12a and 12b for accommodating the first pair of raised portions 6a and 6b is provided at the terminal ends of the wings 11a and 11b of the bridge 5. Said second pair of seats 12a, 12b is advantageously formed in a portion of the material constituting the bridge 5 having a greater thickness dimension, at the perimetral groove 9.

In order to assemble the bridge 5 and the lens 20, it is sufficient to introduce the apex 60 of the bridge 5 into the V-shaped milling 4, and simultaneously align the perimetral edge 8 with the groove 9. As the bridge 5 is pushed into the milling 4, the raised portions 6a, 6b, 7a, 7b, slide along the groove 9. This causes the wings 11a, 11b of the bridge 5 to be pressed towards each other, i.e. towards the transverse middle axis II—II of the lens 20, by causing elastic deformation of the bridge 5 itself. This condition prevails until alignment of the first pair of seats 10a, 10b with the second pair of raised portions 7a, 7b and alignment of the second pair of seats 12a, 12b with the first pair of raised portions 6a, 6b. When such alignment is achieved, the temporary elastic deformation of the bridge 5 generates a spring biasing force which causes the second pair of raised portions 7a, 7b to snap into engagement with the first seats 10a, 10b and the first pair of raised portions 6a, 6b to snap into engagement with the second seats 12a, 12b. The perimetral edge 8 of the lens 20 is then positioned correctly in the groove 9, and the bridge assumes its normal unstressed configuration and is thus engaged with the milling 4.

The lens 3 furthermore has, proximate to the lateral ends 13a and 13b, a pair of air vents or intakes indicated by the reference numerals 14a and 14b.

Said air intakes are obtained by providing a hole at the lens; a stud is then associated with said hole, and the flow of air is expediently reduced therein by means of the presence of a mesh, indicated by the numerals 15a and 15b. In this way, misting of the lens is prevented without thereby creating undesiderable air-currents. The mesh also prevents the ingress of foreign bodies such as dust or snow.

The use of the structure is therefore as follows: first of all the association of the lug at the lens occurs by gripping said lug at the ends of the wings 11a and 11b, imparting to said wings a slight pressure which causes them to approach one another.

In this manner said lug is positioned so that the first and second pair of raised portions is arranged facing at the second and first pair of seats: by releasing the ends of the wings 11a and 11b, the automatic engagement of the former to these last is achieved.

The use of at least three temporary coupling elements provided on the lens for complementarily shaped grip elements provided on the bridge allows the optimum coupling of the bridge to the lens.

The presence of the air intakes 14a and 14b furthermore allows an optimum passage of the flow of air at the surface of the lens which faces the user's face, ensuring perfect vision through all portions of the lens in any condition.

It has thus been observed that the invention has achieved the intended aim and objects, a structure of sunglasses having been obtained which allows good aeration of the lens, preventing it from misting.

The sunglasses structure furthermore has a removable bridge which is at the same time firmly associable with the lens without said bridge being subject to accidental removal.

This allows, for example in case of a fall, to avoid that a possible uncoupling of the lug may lead to an abutment of the perimetral edge 8 of the lens 3 at the nasal septum of the user, causing injury.

The invention is naturally susceptible to numerous modifications and variations, all of which are within the scope of the same inventive concept.

Thus, for example, any number of air vents of any convenient size may be used, and they may be arranged at any suitable position at the lateral region of the lens 20.

The partial closure of one or more air vents may naturally occur with any device such as, for example, a sliding shutter or a removable cover.

The number of temporary coupling elements provided on the lens may furthermore by any, though preferably at least three.

Finally, the materials, as well as the dimensions which constitute the individual components of the structure, may also naturally be the most appropriate according to the specific requirements. Advantageously the cross member 30 and the arms 2a, 2b are made of plastic material, while the cover element may be made of rubber.

I claim:

1. Sunglasses structure comprising a front portion, two arms hinged to said front portion, an arcuately shaped lens connected to said front portion, a downwardly open V-shaped milling formed centrally in said lens, said V-shaped milling comprising a perimetral edge a first pair of raised portions protruding inwardly from said perimetral edge, and a second pair of raised portions protruding inwardly from said perimetral edge, an elastically deformable V-shaped bridge being connected to said V-shaped milling, said bridge having a perimetral groove and wings, said perimetral groove accommodating said perimetral edge of said V-shaped milling and comprising a first pair of seats, said first pair of seats accommodating said second pair of raised portions, said wings having ends, said ends comprising a second pair of seats, said second pair of seats accommodating said first pair of raised portions.

2. Sunglasses structure according to claim 1, wherein said front portion comprises a cross member, said cross member having enlarged end portions and an inner face, said inner face abutting said lens, said enlarged end portions each comprising an elongate groove, said elongate groove accommodating a portion of said lens.

3. Sunglasses structure according to claim 2, wherein said cross member has an upper surface, and wherein said lens has an upper peripheral portion, said sunglasses structure further comprising a cover element, said cover element having formed therein a recess, said recess comprising a first face and a second face, said first face being in abutment engagement with said upper surface of said cross member, said second face being in abutment engagement with said upper peripheral portion of said lens.

4. Sunglasses according to claim 3, wherein said cover element is made of rubber.

5. Sunglasses according to claim 3, wherein said cover element has an irregular hexagonal cross-sectional configuration.

6. Sunglasses structure according to claim 2, wherein said cross member has an upper surface and an inner face, and wherein said lens has an upper peripheral portion, said sunglasses structure further comprising a cover element, said cover element having formed therein a recess, said recess defining a first face and a second face, said first face being in abutment engagement with said upper surface of said cross member, said second face being in abutment engagement with said upper peripheral portion of said lens,
   wherein said upper peripheral portion of said lens is located between said inner face of said cross member and said second face of said recess formed in said cover element.

7. Sunglasses structure according to claim 1, wherein said front portion comprises a cross member, said cross member having enlarged end portions and an inner face, said inner face abutting said lens, said enlarged end portions each comprising an elongate groove, said elongate groove accommodating a portion of said lens,
   wherein said cross member has an upper surface, and wherein said lens has an upper peripheral portion, said sunglasses structure further comprising a cover element, said cover element having formed therein a recess, said recess comprising a first face and a second face, said first face being in abutment engagement with said upper surface of said cross member, said second face being in abutment engagement with said upper peripheral portion of said lens, said cover element comprising, proximate to each of said enlarged end portions, a terminal portion, a tongue connected to each said terminal portion and having a lateral surface, a connection recess formed in each of said enlarged end portions adjacent said elongate groove, said connection recess comprising an abutment face, said abutment face engaging said lateral surface of said tongue.

8. Sunglasses structure according to claim 7, wherein said cover element further comprises a first inclined surface, said first inclined surface extending substantially perpendicularly to said lateral surface of said tongue.

9. Sunglasses structure according to claim 7, wherein each said enlarged end portion further comprises a second inclined surface, said second inclined surface extending substantially perpendicular to said abutment face of said connection recess.

10. Sunglasses structure according to claim 7, wherein said cover element further comprises a first inclined surface, said first inclined surface extending substantially perpendicularly to said lateral surface of said tongue,
   wherein each said enlarged end portion further comprises a second inclined surface, said second inclined surface extending substantially perpendicular to said abutment face of said connection recess, and
   wherein said first inclined surface abuts against said second inclined surface.

11. Sunglasses structure according to claim 1, wherein said lens comprises air intake means, said air intake means being provided through said lens and arranged substantially symmetrically with respect to said V-shaped milling.

12. Sunglasses structure according to claim 11, wherein said air intake means comprise at least two air intakes, said air intakes each comprising a hole, a stud, and a mesh-like element, said hole being formed in said lens, said stud being accommodated in said hole, said mesh-like element being connected to said stud.

13. Sunglasses according to claim 1, wherein said second pair of raised portions is releasable from said first pair of seats and said first pair of raised portions is releasable from said second pair of seats upon elastic deformation of said V-shaped bridge.

* * * * *